United States Patent [19]

Suzuki et al.

[11] Patent Number: 5,982,514
[45] Date of Patent: *Nov. 9, 1999

[54] OPTICAL-SIGNAL/ELECTRIC-SIGNAL CONVERTING DEVICE

[75] Inventors: Takahiro Suzuki; Noboru Kanzaki; Takashi Yoshida; Kenji Asanuma; Eiichi Nabeta, all of Kawasaki, Japan

[73] Assignee: Fuji Electric Co., Ltd., Kawasaki, Japan

[*] Notice: This patent is subject to a terminal disclaimer.

[21] Appl. No.: 09/088,104

[22] Filed: Jun. 1, 1998

Related U.S. Application Data

[63] Continuation-in-part of application No. 08/631,262, Apr. 12, 1996, abandoned, and a continuation-in-part of application No. 08/939,631, Sep. 29, 1997, which is a division of application No. 08/500,437, Jul. 10, 1995, Pat. No. 5,729,371.

[30] Foreign Application Priority Data

Jul. 11, 1994 [JP] Japan ..................................... 6-158752
Apr. 17, 1995 [JP] Japan ..................................... 7-090608

[51] Int. Cl.[6] .................................................. H04B 10/08
[52] U.S. Cl. ........................................... 359/110; 359/184
[58] Field of Search ..................................... 359/152, 119, 359/110, 154, 161, 184, 185, 186, 162

[56] References Cited

U.S. PATENT DOCUMENTS

| | | | |
|---|---|---|---|
| 4,422,179 | 12/1983 | Albanese . | |
| 4,612,670 | 9/1986 | Henderson | 359/164 |
| 4,644,587 | 2/1987 | Takahashi . | |
| 4,731,784 | 3/1988 | Keller et al. | 359/119 |
| 5,040,242 | 8/1991 | Tsuchiya . | |
| 5,060,224 | 10/1991 | Konishi | 359/119 |
| 5,189,544 | 2/1993 | Sailer . | |
| 5,214,456 | 5/1993 | Tonomura | 359/184 |
| 5,465,254 | 11/1995 | Wilson et al. | 359/119 |
| 5,475,778 | 12/1995 | Webb . | |
| 5,729,371 | 3/1998 | Yoshida et al. | 359/154 |

OTHER PUBLICATIONS

Physical Layer Specification and Definition Optical Fibres–IEC; Mar. 1994.

*Primary Examiner*—Rafael Bacares
*Attorney, Agent, or Firm*—Greer, Burns & Crain Ltd.

[57] ABSTRACT

An optical-signal/electric-signal converting device communications system for a communications system that establishes communications using electric and optical signals. The converting device converts an electric transmission signal into an optical transmission signal and an optical transmission signal into an electric transmission signal. The converting device includes an electric signal receiving circuit for receiving the electric transmission signal transmitted from the host computer of the communications system through an electric transmission line, and a modulating circuit for modulating the electric signal sent from the electric signal receiving circuit into a pulse signal having pulses of a smaller width. The converting device also includes an optical signal receiving circuit for receiving the optical transmission signal from the optical transmission line of the system and converting the received signal into an electric signal using a light-receiving element, and a demodulation circuit for demodulating the electric signal received from the optical signal receiving circuit into a pulse signal having pulses of a larger width.

18 Claims, 7 Drawing Sheets

OPTICAL-SIGNAL/ELECTRIC-SIGNAL CONVERTING DEVICE

This is a continuation-in-part of application Ser. No. 08/631,262, filed Apr. 12, 1996, now abanboned and application Ser. No. 08/939,631, filed Sep. 29, 1997, which is a divisional of application Ser. No. 08/500,437, filed Jul. 10, 1995, now issued as U.S. Pat. No. 5,729,371. U.S. Pat. No. 5,729,371 and application Ser. No. 08/939,631 are incorporated by reference, in their entirety.

BACKGROUND OF THE INVENTION

1. Field of the Invention

The present invention relates to an optical-signal/electric-signal converting device for converting an optical signal into an electric signal and converting an electric signal into an optical signal in a communications system transmitting both an optical signal and an electric signal, that is, a communications system for establishing optical and electrical communications. For example, the invention relates to an optical-signal/electric-signal converting device for use in an industrial measurement and control system including an optical fiber instrumentation system.

2. Description of the related Art

FIG. 1 shows an example of a conventional communications system establishing both optical and electrical communications.

In the conventional communications system, each electric device 6 is connected to an electric master 2 through a transmission line 7 (hereinafter referred also to an electric transmission line). Each optical device 8 is connected to an optical master 3 through an optical transmission line 9 and an optical signal distributor/coupler (for example, an optical star coupler) 5. The electric master 2 and optical master 3 are connected to a host computer 1 which communicates with the electric devices 6 and optical devices 8.

When both optical devices and electric devices are used as in the above described communications system, two different masters of the optical master 3 and electric master 2 are required for the optical device and electric device, respectively. The two types of the masters are respectively used for the following reasons.

(1) Different communications media are required.
(2) Different electric supply systems are used. That is, an electric device is supplied with electric power through a bus electric supply system while an optical device is a battery-driven device.
(3) Different communications protocols are used for the electric device and optical device because the consumption of electric current is limited, in the optical device. Normally, the optical device uses a protocol which requires fewer times of light-emission and also requires a short time light-emission for long battery life.

As described above, in the conventional communications system using both optical and electric signals, a master is required for each medium. Normally, a master is an expensive device provided with, for example, a personal computer, etc. Accordingly, when two masters are required, the system costs a lot. Furthermore, when an optical-communications protocol is incorporated into a general-purpose electrical communications protocol to commonly use the optical and electrical communications protocols, the optical communications time becomes longer and the lifetime of the battery for the optical device is shortened.

SUMMARY OF THE INVENTION

In consideration of the above described problems, the present invention aims at providing an optical-communications/electric-communications converting device for easily producing, at a low cost, a communications system capable of processing both optical and electric signals.

The optical-signal/electric-signal converting device according to the present invention is used in a communications system for establishing the communications using both the electric and optical signals. The optical-signal/electric-signal converting device converts an electric transmission signal into an optical transmission signal and also converts an optical transmission signal into an electric transmission signal. The converting device comprises an electric signal receiving unit for receiving an electric transmission signal; a modulation unit for modulating the electric signal received from the electric signal receiving unit into a pulse signal having pulses of a smaller width; an optical signal transmission unit for generating and outputting an optical transmission signal by driving a light-emission element using the modulated pulse signal; an optical signal receiving unit for receiving the optical transmission signal and converting it into the electric signal using a light-receiving element; a demodulation unit for demodulating the electric signal received from the optical signal receiving unit into a pulse signal having a pulses of larger width; and an electric signal transmission unit for outputting the demodulated pulse signal as an electric transmission signal.

The optical-signal/electric-signal converting device may further comprise a buffer provided between the electric signal receiving unit and the modulation unit; and a control unit for controlling the buffer according to a signal from the demodulation unit, to prevent a signal from being transmitted from the electric signal transmission unit to the modulation unit.

The optical-signal/electric-signal converting device may further comprise a buffer provided between the demodulation unit and the electric signal transmission unit; and a control unit for controlling the buffer according to a signal from the electric signal receiving unit to prevent a signal from being transmitted from the demodulation unit to the electric signal transmission unit.

The electric signal receiving unit may comprise a filter for selectively extracting a required electric signal from the received electric transmission signal.

The optical signal receiving unit may comprise an amplifying unit for amplifying and outputting an electric signal converted from an optical transmission signal.

The optical-signal/electric-signal converting device may further comprise a monitor unit for preventing a signal from being transmitted from the electric signal receiving unit to the modulation unit according to a signal from the demodulation unit, and for preventing a signal from being transmitted from the demodulation unit to the electric signal transmission unit according to a signal from the electric signal receiving unit; and an operation control unit for controlling the monitor unit.

The monitor unit may monitor a transmission line through which the electric transmission signal is transmitted and notify the operation control unit of an abnormal condition when an abnormal condition is detected in the transmission line. The operation control unit may transmit a predetermined signal to the modulation unit according to the notification from the monitor unit.

The operation control unit may convert the protocol of the electric transmission signal received by the electric signal receiving unit into the protocol for optical signal transmission, and may also convert the protocol of the signal received by the optical signal receiving unit into the protocol for electric signal transmission.

The optical-signal/electric-signal converting device or the units in the converting device may be operated by electric power supplied through a bus.

The optical-signal/electric-signal converting device comprises an electric signal input/output terminal for receiving an electric transmission signal to be input to the electric signal receiving unit and outputting an electric transmission signal transmitted by the electric signal transmission unit; and an optical signal input/output terminal for receiving an optical transmission signal to be input to the optical signal receiving unit and outputting an optical transmission signal transmitted by the optical signal transmission unit. The electric signal input/output terminal may be connected to a host computer of the communications system through an electric master provided for an electric device which communicates with the host computer, and the optical signal input/output terminal may be connected to an optical device which communicates with the host computer.

The electric signal input/output terminal may be connected to an electric device which communicates with the host computer of the communications system, and the optical signal input/output terminal may be connected to the host computer through an optical master for an optical device which communicates with the host computer.

The electric signal input/output terminal may be connected to the host computer of the communications system and the optical signal input/output terminal may be connected to an electric device which communicates with the host computer through an optical transmission line and another optical-signal/electric-signal converting device.

The electric signal input/output terminal may be connected to an electric device which communicates with the host computer of the communications system, and the optical signal input/output terminal may be connected to the host computer through the optical transmission line and another optical-signal/electric-signal converting device.

The system according to the present invention is a communications system capable of establishing communications using electric and optical signals, and comprises a host computer; an electric device communicating with the host computer; an optical device communicating with the host computer; an electric master provided between the electric device and the host computer; and an optical-signal/electric-signal converting device. The optical-signal/electric-signal converting device comprises an electric signal receiving unit for receiving an electric transmission signal from the host computer through the electric master; a modulation unit for modulating an electric signal received from the electric signal receiving unit into a pulse signal having pulses of a smaller width; an optical signal transmission unit for generating and outputting an optical transmission signal to the optical device by driving a light-emission element according to the modulated pulse signal; an optical signal receiving unit for receiving an optical transmission signal sent from the optical device and converting it into the electric signal using a light-receiving element; a demodulation unit for demodulating an electric signal received from the optical signal receiving unit into a pulse signal having pulses of a larger width; and an electric signal transmission unit for outputting the demodulated pulse signal to the host computer through the electric master.

Another communications system according to the present invention comprises a host computer; an electric device communicating with the host computer; an optical device communicating with the host computer; an optical master provided between the optical device and the host computer; and an optical-signal/electric-signal converting device. The optical-signal/electric-signal converting device comprises an electric signal receiving unit for receiving an electric transmission signal from the electric device; a modulation unit for modulating the electric signal received from the electric signal receiving unit into a pulse signal having pulses of a smaller width; an optical signal transmission unit for generating and outputting to the host computer through the optical master by driving an light-emission element according to the modulated pulse signal; an optical signal receiving unit for receiving an optical transmission signal from the optical master and converting it into an electric signal using a light-receiving element; a demodulation unit for demodulating an electric signal received from the optical signal receiving unit into a pulse signal having pulses of a larger width; and an electric signal transmission unit for outputting the demodulated pulse signal to the electric device.

A further communications system according to the present invention comprises a host computer; an electric device communicating with the host computer; an electric master provided between the electric device and the host computer; and a first optical-signal/electric-signal converting device for converting an electric transmission signal received from the host computer through the electric master into an optical transmission signal and outputting it to the optical transmission line; and a second optical-signal/electric-signal converting device for converting the optical transmission signal received from the optical transmission line into an electric transmission signal and outputting it to the electric device. Each of the first and second optical-signal/electric-signal converting devices may comprise an electric signal receiving unit for receiving an electric transmission signal: a modulation unit for modulating an electric signal sent from the electric signal receiving unit into a pulse signal having pulses of a smaller width; an optical signal transmission unit for generating an optical transmission signal by driving a light-emission element using the modulated pulse signal and outputting the generated optical transmission signal to the optical transmission line; an optical signal receiving unit for receiving an optical transmission signal and converting it into the electric signal using a light-receiving element; a demodulation unit for demodulating an electric signal received from the optical signal receiving unit into a pulse signal having pulses of a larger width; and an electric signal transmission unit for outputting the demodulated pulse signal as an electric transmission signal.

The converting device and the communications system according to the invention requires only one master, while the conventional system requires two masters, which are expensive. Accordingly, the present invention successfully realizes a lower cost converting device and communications system. Since an optical transmission signal can be generated according to a differentiated electric signal, the light-emission time can be shortened and the consumption of electric power can be considerably reduced in the optical devices and the converting device in the communications system. Further, since a reflected wave that is generated in the converting device when electric and optical signals are generated can be interrupted, undesired influences on the device by the reflection wave can be avoided. Furthermore, an optical communications protocol can be matched with an electrical communications protocol in the converting device according to the present invention. Additionally, the converting device has the, function of notifying a specified device and master of abnormal conditions if they have arisen in the voltage of the electric signal transmission line.

The following advantages can be obtained from the present invention.

(1) A system for both optical and electrical communications can be easily configured at a low cost.
(2) Since an optical transmission line can be easily used in a communications system, the transmission line can be readily extended using a longer optical transmission line, even in circumstances in which transmission signals in an electric transmission line are subject to noise, or where an effective explosion-proof method is required for the transmission line.
(3) The abnormal condition of an electric transmission line can be informed to each of the devices in the communications system using a microcomputer.
(4) The communications system for both optical and electrical communications can be easily realized at a low cost even when different protocols are used for the optical and electrical communications.

DESCRIPTION OF THE PREFERRED EMBODIMENTS

Figure 1:
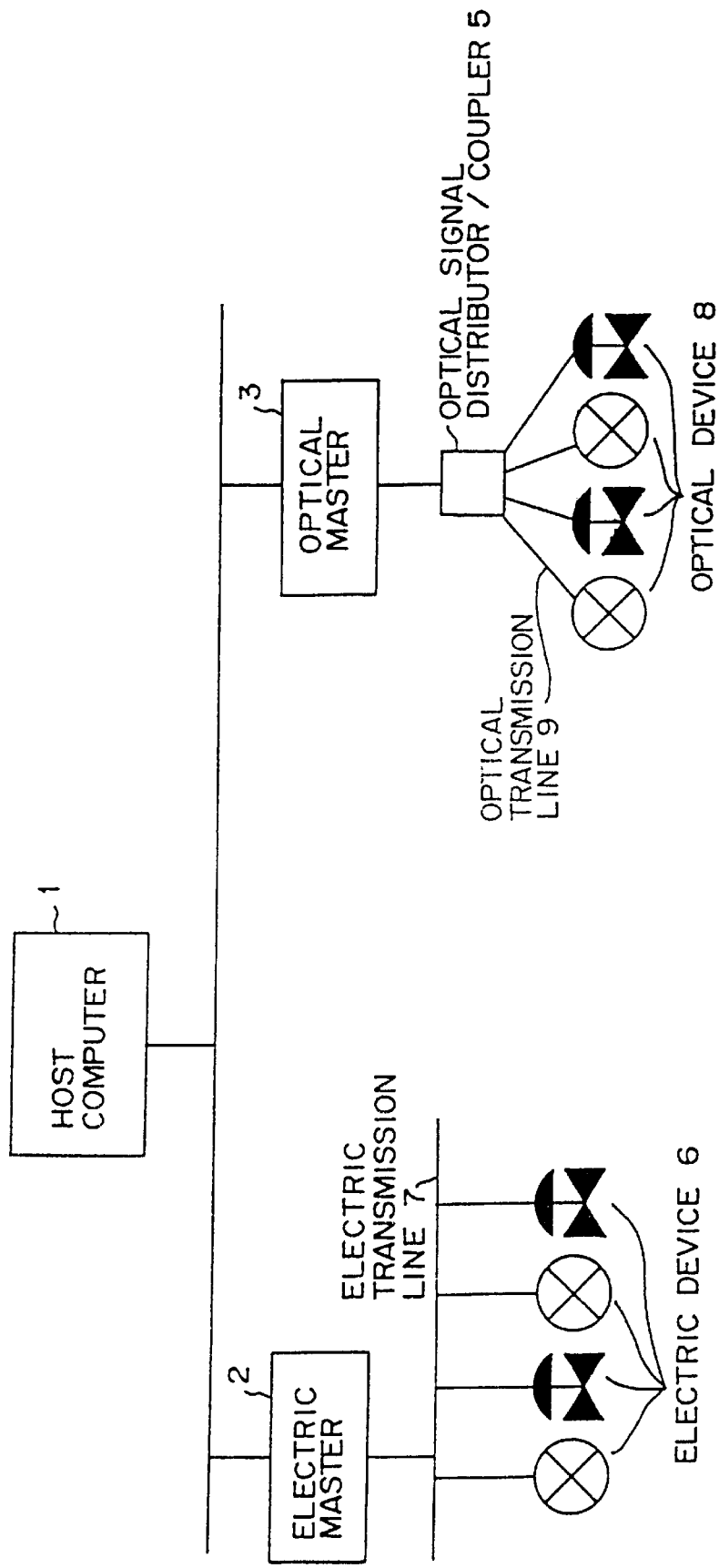
FIG. 1 shows the conventional communications system capable of establishing both optical and electrical communications.
Figure 2:
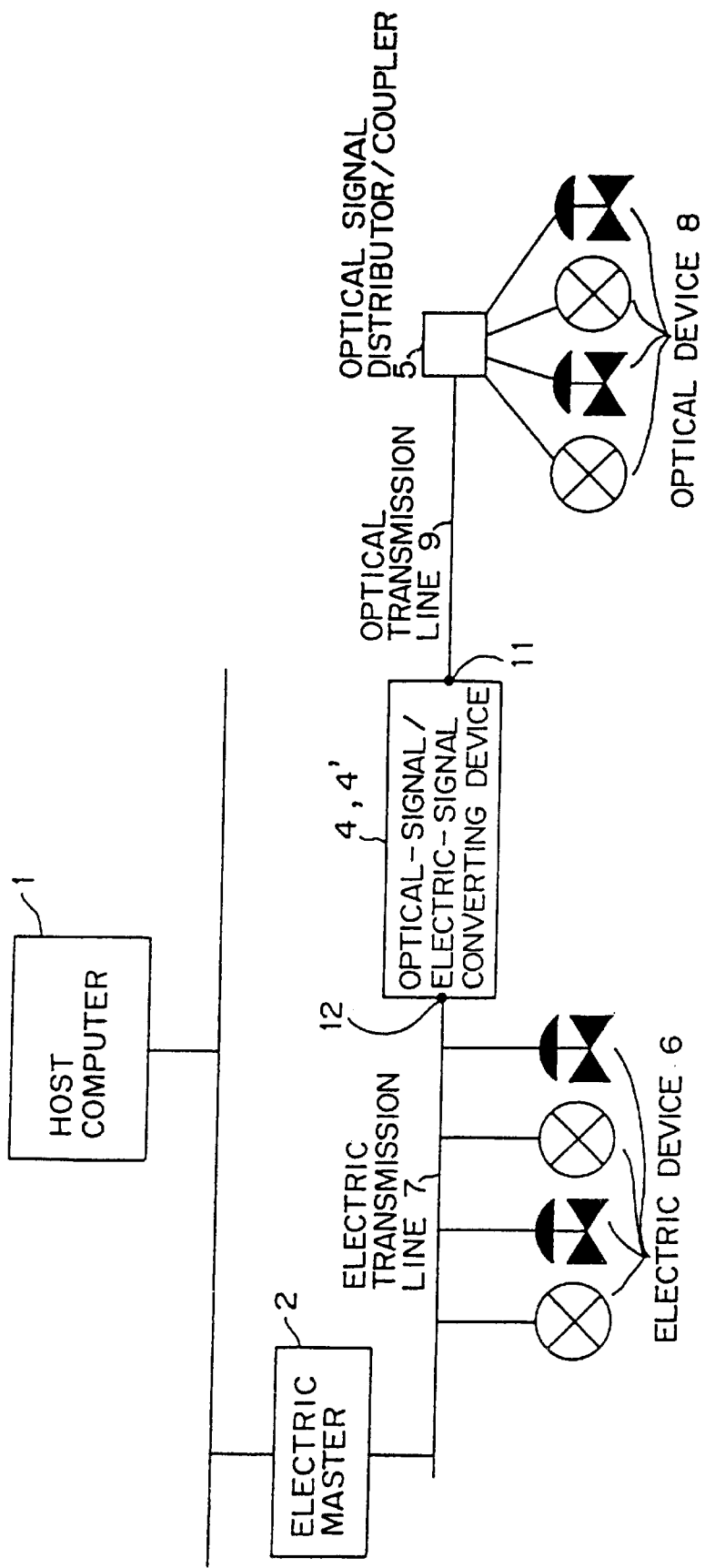
FIG. 2 shows a communications system according to the first embodiment of the present invention.

FIG. 2 shows the communications system according to the first embodiment of the present invention.

As shown in FIG. 2, each of electric devices 6 is connected to a host computer 1 through an electric transmission line 7 and an electric master 2, and each of optical devices 8 is connected to an optical terminal 11 of an optical-signal/electric-signal converting device 4 or 4' of the present invention through an optical signal distributor/coupler 5 and an optical transmission line 9 in the communications system according to the first embodiment. The structure and operation of the optical-signal/electric-signal converting device 4 or 4' are described later in detail.

An electric terminal 12 of the optical-signal/electric-signal converting device 4 or 4' is connected to the electric transmission line 7. An optical signal from each of the optical devices 8 is collected by the optical signal distributor/coupler 5, transmitted to the optical-signal/electric-signal converting device 4 or 4' through the optical transmission line 9, converted into an electric signal in the optical-signal/electric-signal converting device 4 or 4', and then transmitted to the host computer 1 through the electric transmission line 7 and electric master 2. A signal from the host computer 1 to an optical device 8 is transmitted to the optical-signal/electric-signal converting device 4 or 4' through the electric master 2 and electric transmission line 7, converted into an optical signal in the optical-signal/electric-signal converting device 4 or 4', and distributed to an optical device 8 by the optical signal distributor/coupler 5.

The communications system can be particularly effectively operated when a user who has been using the electric device 6 plans to newly add to his or her communications system the optical device 8 to improve the quality in transmission or to protect his or her system against an electric defect or explosion.

The host computer 1 is a higher order device to the electric master 2, and other computers and controllers can be further connected between the host computer 1 and the electric master 2 to realize a higher order hierarchical structure.

Figure 3:
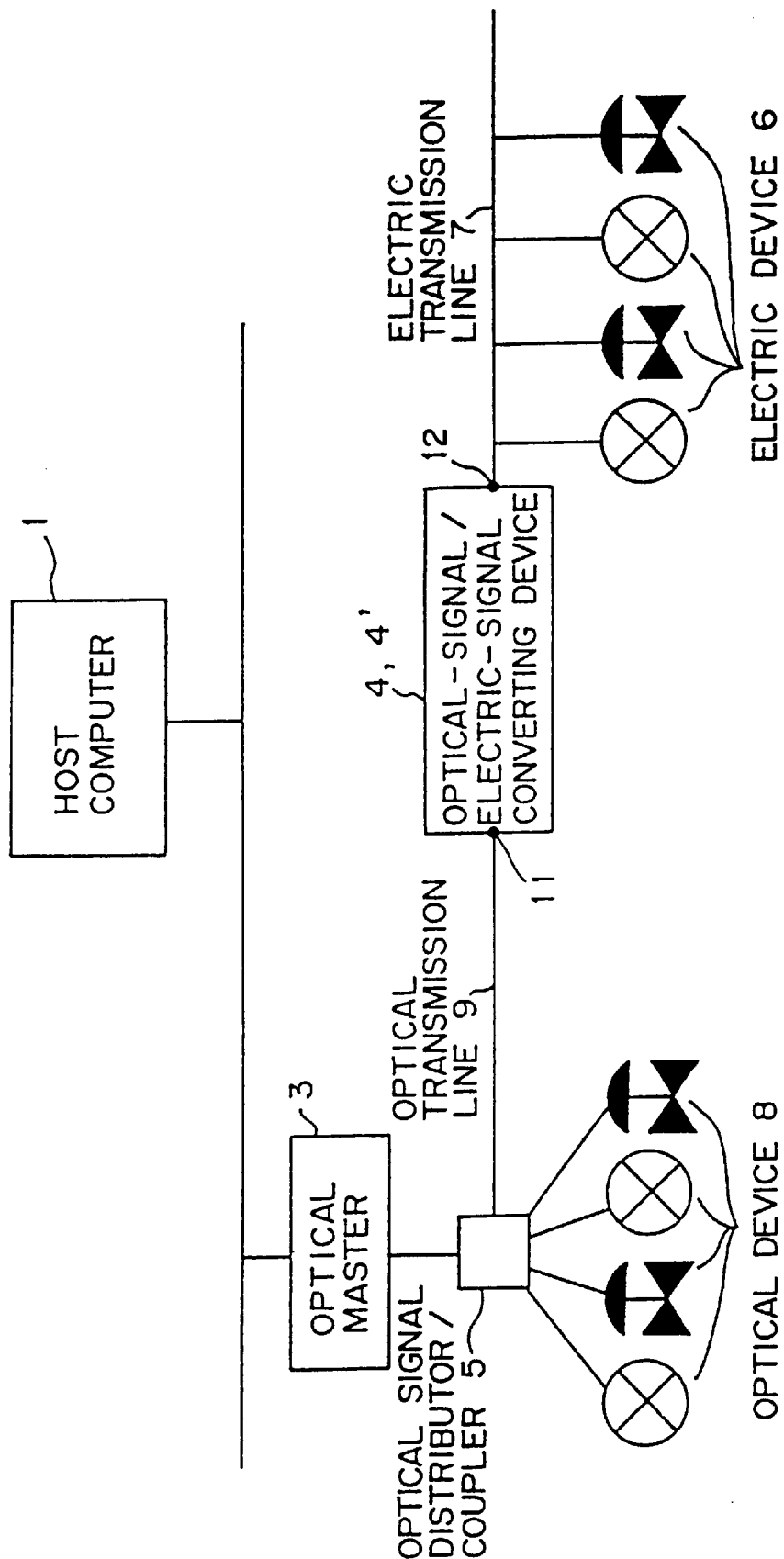
FIG. 3 shows a communications system according to the second embodiment of the present invention.

FIG. 3 shows the communications system according to the second embodiment of the present invention.

As shown in FIG. 3, each of the optical devices 8 is connected to the host computer 1 through the optical signal distributor/coupler 5 and optical master 3, and each of the electric devices 6 is connected to the electric terminal 12 of the optical-signal/electric-signal converting device 4 or 4' through the electric transmission line 7, in the communications system according to the second embodiment of the present invention. The optical terminal 11 of the optical-signal/electric-signal converting device 4 or 4' is connected to the optical transmission line 9. An electric signal from each of the electric devices 6 is transmitted to the optical-signal/electric-signal converting device 4 or 4' through the electric transmission line 7, converted into an optical signal in the optical-signal/electric-signal converting device 4 or 4', and then transmitted to the host computer 1 through the optical transmission line 9, optical signal distributor/coupler 5, and optical master 3. A signal from the host computer 1 to an electric device 6 is transmitted to the optical-signal/electric-signal converting device 4 or 4' through the optical master 3, optical signal distributor/coupler 5, and optical transmission line 9, converted into an electric signal in the optical-signal/electric-signal converting device 4 or 4', and then transmitted to an electric device 6 through the electric transmission line 7.

The communications system can be particularly effectively operated when a user who has been using the optical device 8 plans to newly add the electric device 6 to his or her communications system.

The host computer 1 is a higher order device to the optical master 3, and other computers and controllers can be further connected between the host computer 1 and the optical master 3 to realize a higher order hierarchical structure.

Figure 4:
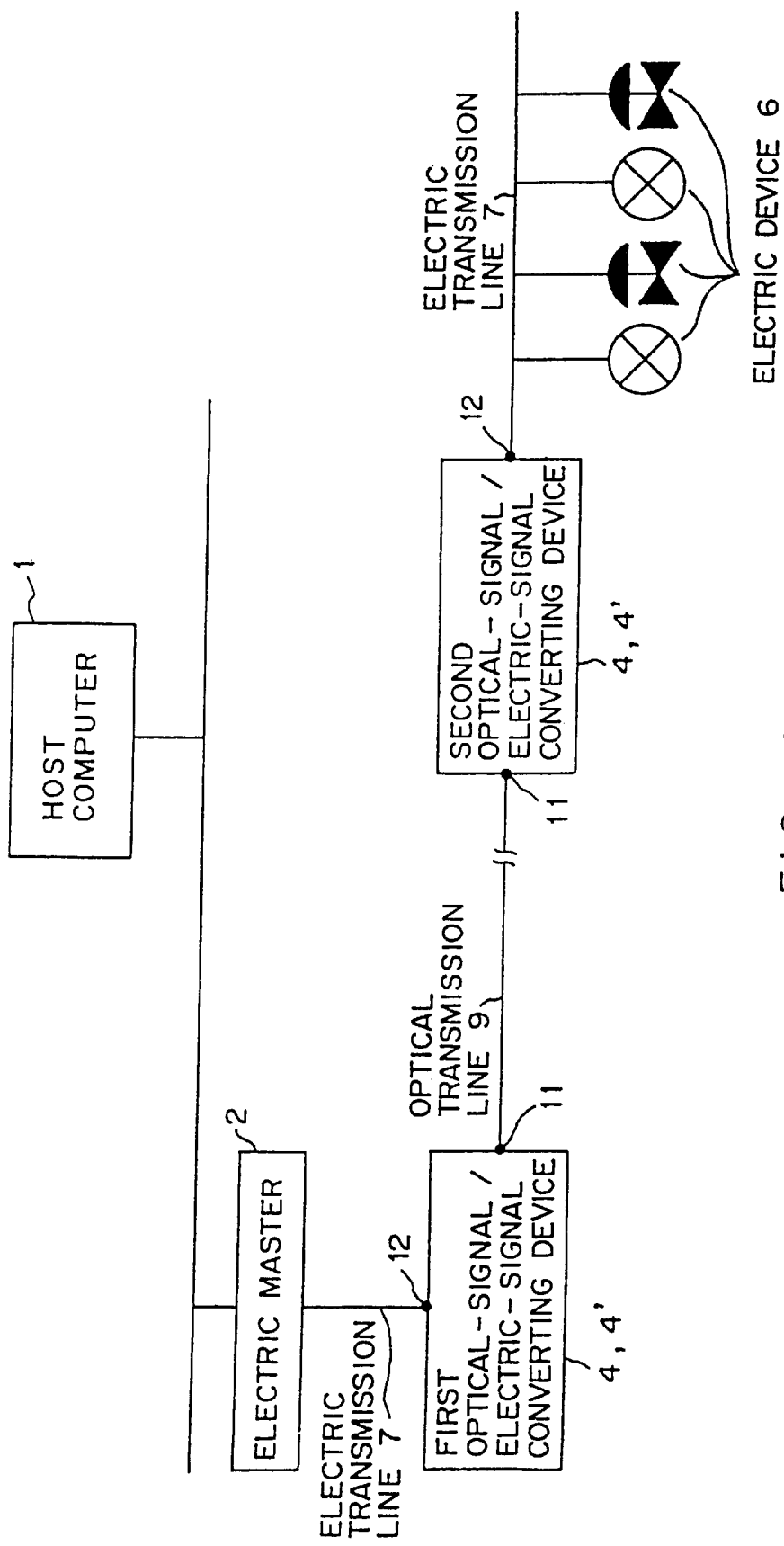
FIG. 4 shows a communications system according to the third embodiment of the present invention.

FIG. 4 shows the communications system according to the third embodiment of the present invention.

As shown in FIG. 4, each of the electric devices 6 is connected to the host computer 1 through two optical-signal/electric-signal converting devices 4 or 4' in the communication system of the third embodiment of the present invention. These two optical-signal/electric-signal converting devices 4 or 4' are connected to each other through the optical transmission line 9.

Each of the electric devices 6 is connected to the electric terminal 12 of the second optical-signal/electric-signal converting device 4 or 4' through the electric transmission line 7. The optical terminals 11 of the first optical-signal/electric-signal converting device 4 or 4' and the second optical-signal/electric-signal converting device 4 or 4' are connected to each other through the optical transmission line 9. The electric terminal 12 of the first optical-signal/electric-signal converting device 4 or 4' is connected to the electric master 2 through the electric transmission line 7.

The electric signal from each of the electric devices 6 is first converted into an optical signal by the second optical-signal/electric-signal converting device 4 or 4', and then transmitted to the first optical-signal/electric-signal converting device 4 or 4' through the optical transmission line 9. The transmitted signal is converted into an electric signal in the first optical-signal/electric-signal converting device 4 or 4', and then transmitted to the host computer 1 through the electric transmission line 7 and electric master 2. The signal from the host computer 1 to an electric device 6 is transmitted to the first optical-signal/electric-signal converting device 4 or 4' through the electric master 2 and electric transmission line 7, converted into an optical signal in the first optical-signal/electric-signal converting device 4 or 4', then converted into an electric signal by the second optical-signal/electric-signal converting device 4 or 4', and distributed to one of the electric devices 6.

The communications system can be particularly effectively operated when an user who has been using the electric device 6 plans to improve the quality of transmission by protecting the signals transmitted through the transmission lines in his or her system against the noise generated by a the strong magnetic field, etc.

The host computer can be used with combinations of the above listed connection forms according to the first through third embodiment of the present invention. The optical-signal/electric-signal converting devices 4 and 4' can be operated by electric power provided through buses.

Figure 5:
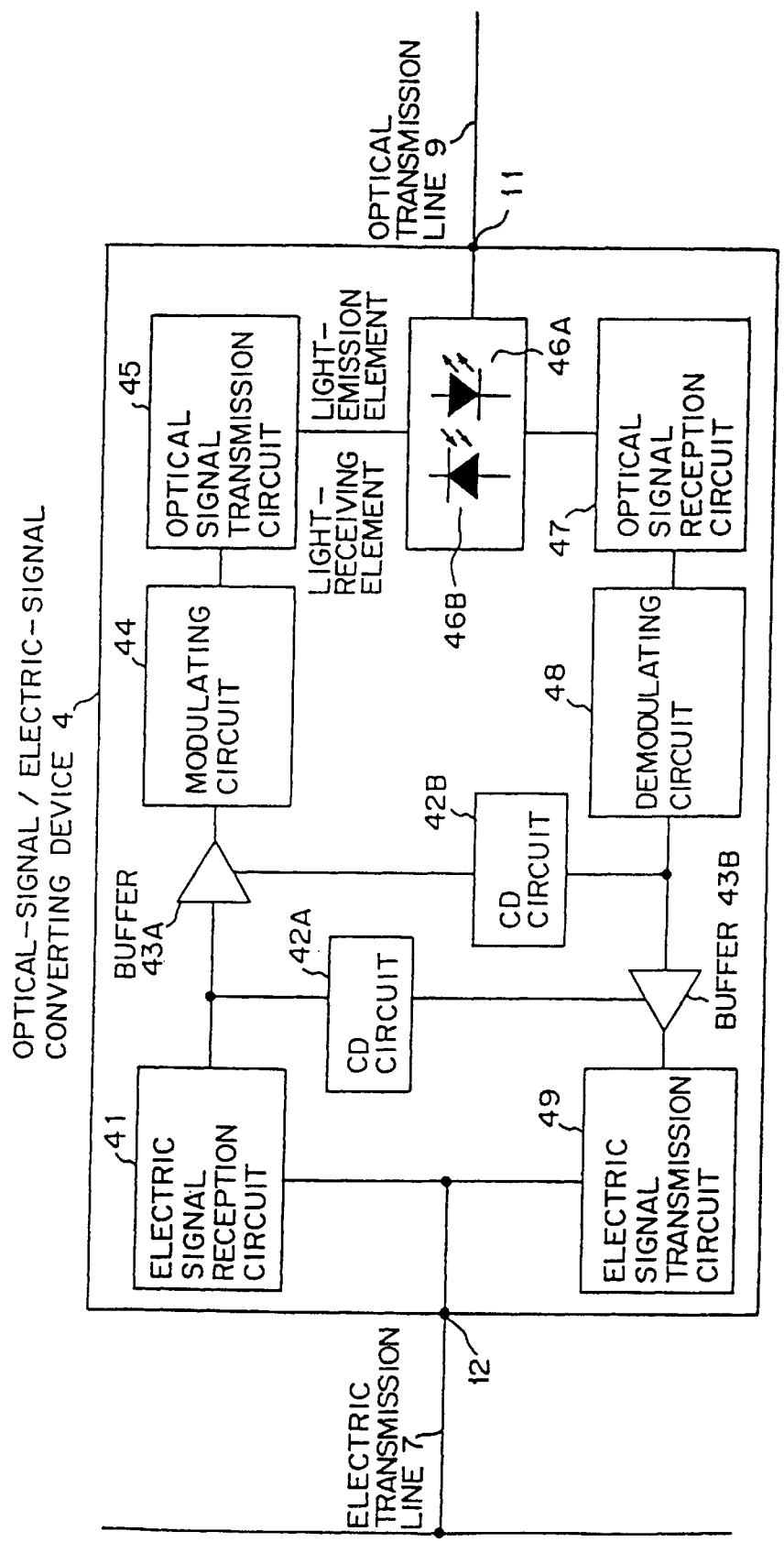
FIG. 5 shows the configuration of a first optical-signal/electric-signal converting device according to the present invention which may be applied to the first through third embodiments.

FIG. 5 shows the configuration of the first optical-signal/electric-signal converting device 4 of the present invention which can be applied to the communications system according to the first through third embodiments.

As shown in FIG. 5, the first optical-signal/electric-signal converting device 4 comprises an electric signal reception circuit 41 including a filter; carrier detection (CD) circuits 42A and 42B as transmission signal detection units; buffers 43A and 43B as gate units; a modulating circuit 44; an optical signal transmission circuit 45; an light-emission element 46A; a light-receiving element 46B; an optical signal reception circuit 47; a demodulating circuit 48; and an electric signal transmission circuit 49. The optical terminal 11 and electric terminal 12 of the optical-signal/electric-signal converting device 4 are respectively connected to the optical transmission line 9 and electric transmission line 7 in the communications system.

When an electric signal is input from the electric transmission line 7 to the electric terminal 12, the electric signal is sent to the electric signal reception circuit 41 where the electric signal is filtered to remove the noise from the electric signal. Then, the electric signal is transmitted to the buffer 43A which outputs the input signal to the modulating circuit 44 without processing the input signal, as long as no signal exists in the optical transmission line 9. The signal input to the modulating circuit 44 is modulated into a pulse signal having pulses of a smaller width in a differentiation process, etc. Using the modulated pulse signal, the optical signal transmission circuit 45 is driven to cause the light-emission element 46A to generate an optical signal, which is transmitted to the optical transmission line 9.

When an output signal of the electric signal reception circuit 41 is then output to the optical transmission line 9, the signal may be transmitted to the optical signal reception circuit 47, then returned to the electric transmission line 7, and encounter an input signal there. To avoid this, a signal is transmitted from the CD circuit 42A to the buffer 43B when the signal is output from the electric signal reception circuit 41, thereby rejecting the input signal from being sent to the electric signal transmission circuit 49.

When an optical signal is input from the optical transmission line 9 to the optical terminal 11, the optical signal is converted into an electric signal using the light-receiving element 46B, and then input to the demodulating circuit 48 after being amplified by an amplifier in the optical signal reception circuit 47. The modulated electric signal is demodulated by the demodulating circuit 48. The signal output from the demodulating circuit 48 is input to the buffer 43B, which outputs the signal without processing it if no signal exists in the electric transmission line 7. The signal output from the buffer 43B is transmitted by the electric signal transmission circuit 49 to the electric transmission line 7 as a transmission signal.

When the output signal of the demodulating circuit 48 is then output to the electric transmission line 7, the signal may be also transmitted to the electric signal reception circuit 41, then returned to the optical transmission line 9, and encounter an input. signal there. To avoid this, a signal is transmitted from the CD circuit 42B to the buffer 43A when the signal is output from the demodulating circuit 48, thereby rejecting the input signal from being sent to the modulating circuit 44.

As described above, an electric signal can be converted into an optical signal and an optical signal can be converted into an electric signal by the first optical-signal/electric-signal converting device 4 according to the present invention.

Figure 6:
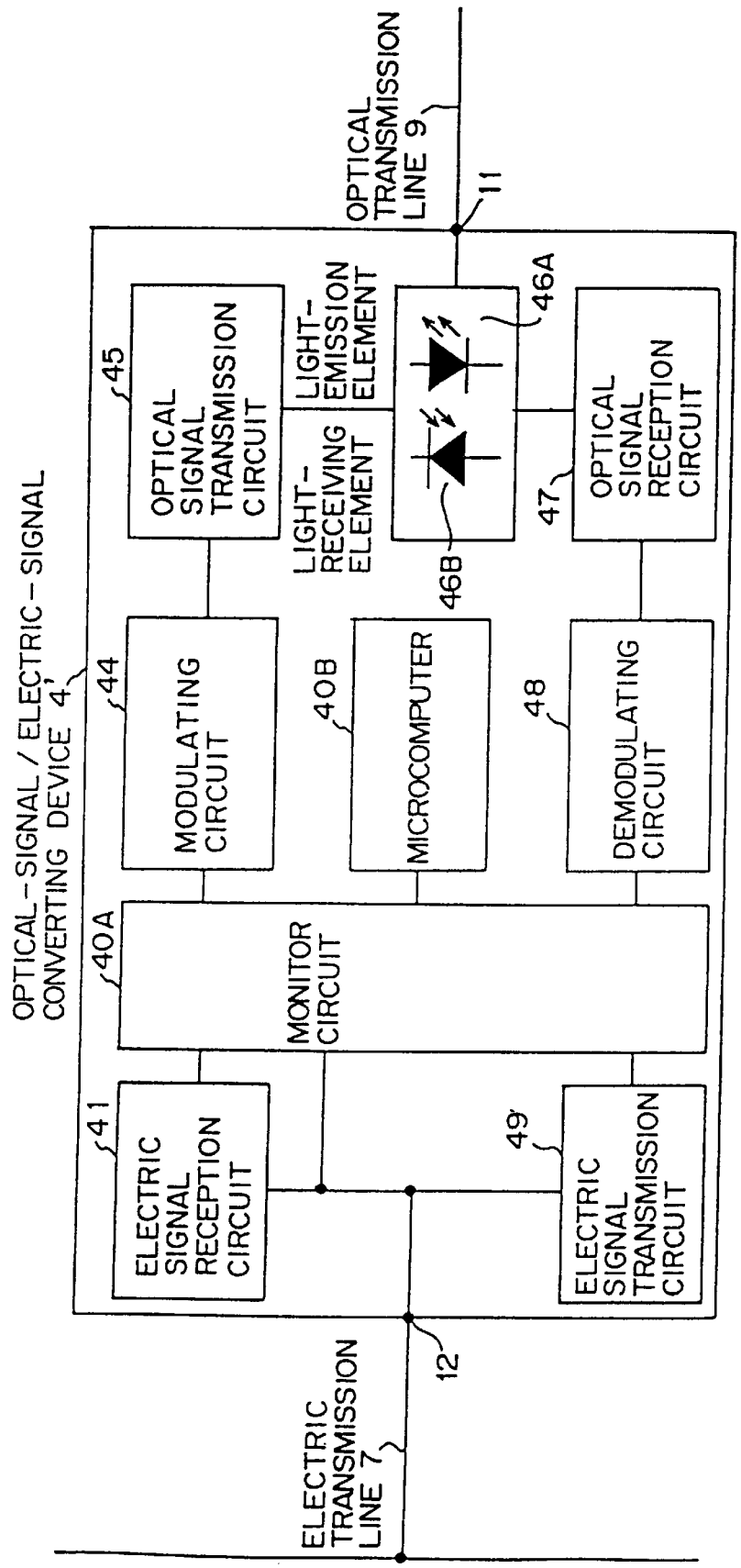
FIG. 6 shows the configuration of a second optical-signal/electric-signal converting device according to the present invention which may be applied to the first through third embodiments.

FIG. 6 shows the configuration of the second optical-signal/electric-signal converting device 4' of the present invention which can be applied to the communications system according to the first through third embodiments.

As shown in FIG. 6, the second optical-signal/electric-signal converting device 4' comprises an electric signal reception circuit 41 including a filter; a monitor circuit 40A; a microcomputer 40B; a modulating circuit 44; an optical signal transmission circuit 45; an light-emission element 46A; a light-receiving element 46B; an optical signal reception circuit 47; a demodulating circuit 48; and an electric signal transmission circuit 49. The optical terminal 11 and electric terminal 12 of the second optical-signal/electric-signal converting device 4' are respectively connected to the optical transmission line 9 and electric transmission line 7 in the communications system. The operations of the CD circuits 42A and 42B and the buffers 43A and 43B of the first optical-signal/electric-signal converting device 4 are performed by the monitor circuit 40A in the second optical-signal/electric-signal converting device 4'. The same reference numbers are assigned to the same elements used in the first and second optical-signal/electric-signal converting devices 4 and 4', and the detailed descriptions are omitted here.

The monitor circuit 40A constantly monitors the electric transmission line 7. When an abnormal condition occurs in the voltage of the electric transmission line 7, such as a short circuit, excess voltage, etc., the microcomputer 40B is informed of the abnormal condition. According to the notification, the microcomputer 40B notifies an external device of the abnormal condition in a predetermined procedure from the modulating circuit 44 through the optical transmission line 9.

For example, when an abnormal condition occurs in the electric transmission line 7 in the communications systems shown in FIGS. 2 and 3, a normal optical device may become inoperative. This causes the entire operation of the communications system to be abnormal or may in certain cases induce an explosion. Therefore, the second optical-signal/electric-signal converting device 4' issues a predetermined command for each optical device to emergency control of the system to avoid a possible accident.

When an abnormal condition arises in the electric transmission line 7 in the communications system shown Lin FIG. 4, the electric master 2 can be informed of the abnormal condition through the optical transmission line 9.

Furthermore, the microcomputer 40B of the optical-signal/electric-signal converting device 4' can convert the protocols between optical signals and electric signals, thereby realizing a communications system capable of establishing both optical and electrical communications using different protocols.

In the communications systems shown in FIGS. 2 and 3, the protocol for the optical communications may successfully match the protocol for the electrical communications by, for example, modifying the microcomputer program or modifying a modem IC in each of the optical devices.

Figure 7:
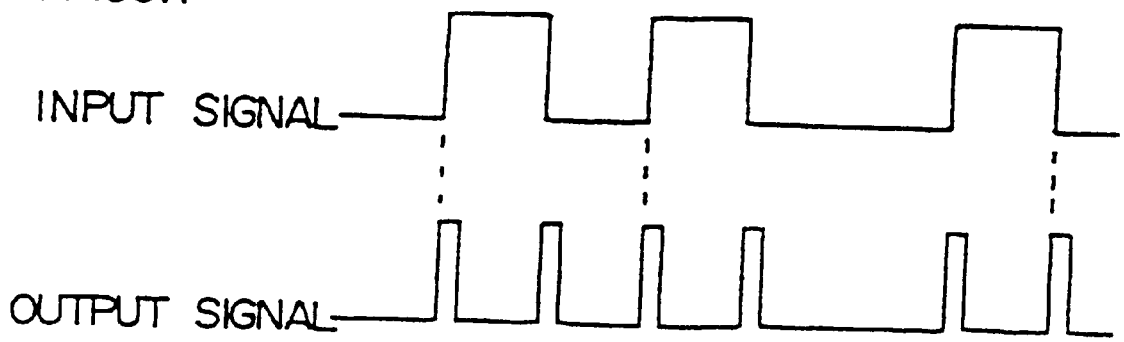
FIG. 7 shows the signal modulating process performed by a modulating circuit in the first and second optical-signal/electric-signal converting devices.
Figure 8:
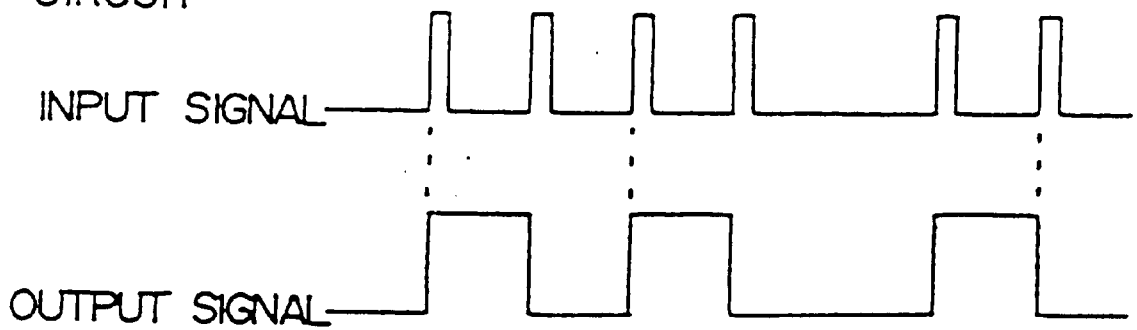
FIG. 8 shows the signal demodulating process performed by a demodulating circuit in the first and second optical-signal/electric-signal converting devices.

FIG. 7 shows the signal modulating process performed by the modulating circuit 44. FIG. 8 shows the signal demodulating process performed by the demodulating circuit 48.

In the modulating circuit 44, as shown in FIG. 7, the input signal is differentiated into shorter pulses, and an optical signal is generated using the shorter pulses. In the demodulating circuit 48, as shown in FIG. 8, the input signal is demodulated into a longer-pulse signal. Therefore, the light-emission time of the light-emission element used in the optical transmission end can be shortened, thereby successfully extending the life-time of the battery for the light-emission. The modulating and demodulating processes can also be performed by the monitor circuit 40A and microcomputer 40B shown in FIG. 6.

What is claimed is:

1. An optical-signal/electric-signal converting device for converting an electric transmission signal into an optical transmission signal and also converting an optical transmission signal into an electric transmission signal in a communications system establishing communications using electric and optical signals, comprising:

electric signal receiving means for receiving an electric transmission signal;

modulation means for modulating an electric signal received from said electric signal receiving means into a pulse signal having a pulse of a smaller width;

optical signal transmission means for generating and outputting an optical transmission signal by driving a light-emission element using the modulated pulse signal;

optical signal receiving means for receiving an optical transmission signal and converting the signal into the electric signal using a light-receiving element;

demodulation means for demodulating the electric signal received from said optical signal receiving means into a pulse signal having a pulse of a larger width; and electric signal transmission means for outputting the demodulated pulse signal as an electric transmission signal.

2. The optical-signal/electric-signal converting device according to claim 1 further comprising:

a buffer provided between said electric signal receiving means and modulation means;

control means for controlling said buffer according to a signal from said demodulation means for preventing a signal from being transmitted from said electric signal receiving means to said modulation means.

3. The optical-signal/electric-signal converting device according to claim 1 further comprising:

a buffer provided between said demodulation means and electric signal transmission means; and control means for controlling said buffer according to a signal from said electric signal receiving means for preventing a signal from being transmitted from said demodulation means to said electric signal transmission means.

4. The optical-signal/electric-signal converting device according to claim 1, wherein said electric signal receiving means comprises a filter selectively extracting a required electric signal from a received electric transmission signal.

5. The optical-signal/electric-signal converting device according to claim 1, wherein said optical signal receiving means comprises an amplifying means for amplifying and outputting an electric signal converted from an optical transmission signal.

6. The optical-signal/electric-signal converting device according to claim 1 further comprising:

monitor means for preventing a signal from being transmitted from said electric signal receiving means to said modulation means according to a signal from said demodulation means, and for preventing a signal from being transmitted from said demodulation means to said electric signal transmission means according to a signal from said electric signal receiving means; and operation control means for controlling said monitor means.

7. The optical-signal/electric-signal converting device according to claim 6, wherein said monitor means monitors a transmission line for transmitting an electric transmission signal, and notifying said operation control means of an abnormal condition detected in said transmission line; and said operation control means transmits a predetermined signal to said modulation means according to a notification from said monitor means.

8. The optical-signal/electric-signal converting device according to claim 4, wherein said operation control means converts a protocol for an electric transmission signal received by said electric signal receiving means into a protocol for optical signal transmission, and converts a protocol for a signal received by said optical signal receiving means into a protocol for electric signal transmission.

9. The optical-signal/electric-signal converting device according to claim 1, wherein said optical-signal/electric-signal converting device is operated by electric power provided through a bus.

10. The optical-signal/electric-signal converting device according to claim 1 further comprising:

an electric signal input/output terminal for receiving an electric transmission signal to be input to said electric signal receiving means and outputting an electric transmission signal transmitted by said electric signal transmission means; and an optical signal input/output terminal for receiving an optical transmission signal to be input to said optical signal receiving means and outputting an optical transmission signal transmitted by said optical signal transmission means, wherein said electric signal input/output terminal is connected to a host computer of the communications system through an electric master for an electric device communicating with the host computer; and said optical signal input/output terminal is connected to an optical device communicating with the host computer.

11. The optical-signal/electric-signal converting device according to claim 1 further comprising:

an electric signal input/output terminal for receiving an electric transmission signal to be input to said electric signal receiving means and outputting an electric transmission signal transmitted by said electric signal transmission means; and an optical signal input/output terminal for receiving an optical transmission signal to be input to said optical signal receiving means and outputting an optical transmission signal transmitted by said optical signal transmission means, wherein said electric signal input/output terminal is connected to an electric device communicating with a host computer of the communications system; and said optical signal input/output terminal is connected to the host computer through an optical master for an optical device communicating with the host computer.

12. The optical-signal/electric-signal converting device according to claim 1 further comprising:

an electric signal input/output terminal for receiving an electric transmission signal to be input to said electric signal receiving means and outputting an electric transmission signal transmitted by said electric signal transmission means; and an optical signal input/output terminal for receiving an optical transmission signal to be input to said optical signal receiving means and outputting an optical transmission signal transmitted by said optical signal transmission means, wherein said electric signal input/output terminal is connected to a host computer of the communications system; and said optical signal input/output terminal is connected to an electric device communicating with the host computer through an optical transmission line and another optical-signal/electric-signal converting device.

13. The optical-signal/electric-signal converting device according to claim 1 further comprising:

an electric signal input/output terminal for receiving an electric transmission signal to be input to said electric signal receiving means and outputting an electric transmission signal transmitted by said electric signal transmission means; and an optical signal input/output terminal for receiving an optical transmission signal to be input to said optical signal receiving means and outputting an optical transmission signal transmitted by said optical signal transmission means, wherein said electric signal input/output terminal is connected to an electric device communicating with a host computer of the system; and said optical signal input/output terminal is connected to the host computer through an optical transmission line and another optical-signal/electric-signal converting device.

14. A communications system for establishing communications using an electric signal and an optical signal, comprising:

a host computer;

an electric device communicating with said host computer;

an optical device communicating with said host computer;

an electric master provided between said electric device and said host computer; and an optical-signal/electric-signal converting device comprising an electric signal receiving means for receiving an electric transmission signal transmitted from said host computer through said electric master; modulation means for modulating the electric signal received from said electric signal receiving means into a pulse signal having a pulse of a smaller width; optical signal transmission means for generating an optical transmission signal by driving a light-emission element using the modulated pulse signal and outputting the optical transmission signal to said optical device; optical signal receiving means for receiving an optical transmission signal sent from said optical device and converting the received optical transmission signal into an electric signal using a light-receiving element; demodulation means for demodulating an electric signal received from said optical signal receiving means into a pulse signal having a pulse of a larger width; and electric signal transmission means for outputting the demodulated pulse signal to said host computer through said electric master.

15. A communications system for establishing communications using an electric signal and an optical signal, comprising:

a host computer;

an electric device communicating with said host computer;

an optical device communicating with said host computer;

an optical master provided between said electric device and said host computer; and an optical-signal/electric-signal converting device comprising an electric signal receiving means for receiving an electric transmission signal transmitted from said electric device; modulation means for modulating the electric signal received from said electric signal receiving means into a pulse signal having a pulse of a smaller width; optical signal transmission means for generating an optical transmission signal by driving a light-emission element using the modulated pulse signal and outputting the optical transmission signal to said host computer through said optical master; optical signal receiving means for receiving an optical transmission signal sent from said optical master and converting the received optical transmission signal into an electric signal using a light-receiving element; demodulation means for demodulating an electric signal received from said optical signal receiving means into a pulse signal having a pulse of a larger width; and electric signal transmission means for outputting the demodulated pulse signal to said electric device.

16. The communications system for establishing communications using an electric signal and an optical signal, comprising:

a host computer;

an electric device communicating with said host computer;

an electric master provided between said electric device and said host computer;

a first optical-signal/electric-signal converting device for converting an electric transmission signal transmitted from said host computer through said electric master into an optical transmission signal and outputting the optical transmission signal to an optical transmission line; and a second optical-signal/electric-signal converting device for converting the optical transmission signal received through said optical transmission line into an electric transmission signal and outputting the converted electric transmission signal to said electric device;

wherein each of said first and second optical-signal/electric-signal converting devices comprises:

electric signal receiving means for receiving an electric transmission signal;

modulation means for modulating an electric signal sent from said electric signal receiving means into a pulse having a pulse of a smaller width;

optical signal transmission means for generating an optical transmission signal by driving a light emission element using the modulated pulse signal and outputting the generated optical transmission signal to the optical transmission line;

optical signal receiving means for receiving an optical transmission signal and converting the received optical transmission signal into an electric signal by a light-receiving element;

demodulation means for demodulating an electric signal received from said optical signal receiving means into a pulse signal having a pulse of a larger width; and electric signal transmission means for outputting the demodulated pulse signal as an electric transmission signal.

17. An optical-signal/electric-signal converting device for converting an electric transmission signal into an optical transmission signal and also converting an optical transmission signal into an electric transmission signal in a communications system establishing communications using electric and optical signals, comprising:

electric signal receiving means for receiving an electric transmission signal;

modulation means for modulating an electric signal received from said electric signal receiving means into a pulse signal having a pulse of a smaller width;

optical signal transmission means for generating and outputting an optical transmission signal by driving a light-emission element using the modulated pulse signal;

optical signal receiving means for receiving an optical transmission signal and converting the signal into the electric signal using a light-receiving element;

demodulation means for demodulating the electric signal received from said optical signal receiving means into a pulse signal having a pulse of a larger width;

electric signal transmission means for outputting the demodulated pulse signal as an electric transmission signal;

an electric signal input/output terminal for receiving an electric transmission signal to be input to said electric signal receiving means and outputting an electric transmission signal transmitted by said electric signal transmission means; and an optical signal input/output terminal for receiving an optical transmission signal to be input to said optical signal receiving means and outputting an optical transmission signal transmitted by said optical signal transmission means, wherein said electric signal input/output terminal is connected to a host computer of the communications system; and said optical signal input/output terminal is connected to an electric device communicating with the host computer through an optical transmission line and another optical-signal/electric-signal converting device.

18. An optical-signal/electric-signal converting device for converting an electric transmission signal into an optical transmission signal and also converting an optical transmission signal into an electric transmission signal in a communications system establishing communications using electric and optical signals, comprising:

electric signal receiving means for receiving an electric transmission signal;

modulation means for modulating an electric signal received from said electric signal receiving means into a pulse signal having a pulse of a smaller width;

optical signal transmission means for generating and outputting an optical transmission signal by driving a light-emission element using the modulated pulse signal;

optical signal receiving means for receiving an optical transmission signal and converting the signal into the electric signal using a light-receiving element;

demodulation means for demodulating the electric signal received from said optical signal receiving means into a pulse signal having a pulse of a larger width;

electric signal transmission means for outputting the demodulated pulse signal as an electric transmission signal;

an electric signal input/output terminal for receiving an electric transmission signal to be input to said electric signal receiving means and outputting an electric transmission signal transmitted by said electric signal transmission means; and an optical signal input/output terminal for receiving an optical transmission signal to be input to said optical signal receiving means and outputting an optical transmission signal transmitted by said optical signal transmission means, wherein said electric signal input/output terminal is connected to an electric device communicating with a host computer of the system; and said optical signal input/output terminal is connected to the host computer through an optical transmission line and another optical-signal/electric-signal converting device.

* * * * *

UNITED STATES PATENT AND TRADEMARK OFFICE
CERTIFICATE OF CORRECTION

PATENT NO. : 5,982,514
DATED : November 9, 1999
INVENTOR(S) : Suzuki et al.

It is certified that error appears in the above-indentified patent and that said Letters Patent is hereby corrected as shown below:

In the Claims:

In claim 16, lines 29-30, please delete "light emission" and insert --light-emission-- therefor Signed and Sealed this Twenty-ninth Day of May, 2001

Attest:

NICHOLAS P. GODICI

*Attesting Officer*      *Acting Director of the United States Patent and Trademark Office*